(12) United States Patent
Chen

(10) Patent No.: US 8,102,610 B2
(45) Date of Patent: Jan. 24, 2012

(54) LENS ASSEMBLY WITH A FITTING STRUCTURE

(75) Inventor: Chien-Chou Chen, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 12/475,649

(22) Filed: Jun. 1, 2009

(65) Prior Publication Data
US 2010/0039716 A1    Feb. 18, 2010

(30) Foreign Application Priority Data
Aug. 18, 2008 (TW) ................... 97131416 A

(51) Int. Cl.
*G02B 7/02* (2006.01)
(52) U.S. Cl. ....................... 359/819; 359/827
(58) Field of Classification Search ........... 359/823, 359/827, 829, 830, 819
See application file for complete search history.

(56) References Cited

U.S. PATENT DOCUMENTS
4,662,717 A * 5/1987 Yamada et al. ............... 359/827
* cited by examiner

*Primary Examiner* — Alicia M Harrington
(74) *Attorney, Agent, or Firm* — Vierra Magen Marcus & DeNiro LLP

(57) ABSTRACT

A lens assembly includes a first lens and a second lens. The first lens includes a first inner end surface, a first outer end surface and slots. The slots formed on the first inner end surface extends toward the first outer end surface, and each slot includes a trough and an inner engaging side portion. The second lens includes a second inner end surface, a second outer end surface and engaging blocks. The engaging blocks formed on the second inner end surface extends toward the first inner end surface of the first lens, and each engaging block includes a crest portion disposed next to the first inner end surface of the first lens and an inner engaging protrusion. A slit is defined by the inner engaging side portion and the trough portion of the slot and the inner engaging protrusion and the crest portion of the engaging block.

3 Claims, 5 Drawing Sheets

LENS ASSEMBLY WITH A FITTING STRUCTURE

CROSS REFERENCE TO RELATED APPLICATIONS

This Application claims priority of Taiwan Patent Application No. 97131416, filed on Aug. 18, 2008, the entirety of which is incorporated by reference herein.

BACKGROUND OF THE INVENTION

1. Field of the Invention

The present invention relates to a lens assembly, and in particular relates to a lens assembly with a fitting structure.

2. Description of the Related Art

FIG. 1 is an assembled cross section of a conventional lens module 1. The lens module 1 comprises a lens cylinder 11 and a lens assembly 12. The lens cylinder 11 has a light axis 100 and a cylindrical wall 111 enclosing the light axis 100. An accommodating space 112 is defined by an inner surface of the cylindrical wall 111 of the lens cylinder 11. The lens assembly 12 disposed in the accommodating space 112 comprises a first lens 121 having a first outer circumferential surface 123 and a second lens 122 having a second outer circumferential surface 124. A first clearance 101 is formed between the first outer circumferential surface 123 of the first lens 121 and the inner surface of the cylindrical wall 111 of the lens cylinder 11. A second clearance 102 is formed between the second outer circumferential surface 124 of the second lens 122 and the inner surface of the cylindrical wall 111 of the lens cylinder 11.

However, the following inconveniences are encountered when manufacturing the lens module 1. For example, all dimensions for the inner surface of the cylindrical wall 111 of the lens cylinder 11 as well as the first and second outer circumferential surfaces 123 and 124 must be precisely manufactured and fitted. If the tolerance of the first or second clearance 101 or 102 is inaccurate, the center of the first or second lenses 121 or 122 is not located at the light axis 100, resulting in resolution decrease and optical performance defects.

Furthermore, the first and second clearance 101 and 102 should be small and as equal as possible to increase the optical performance. Due to the requirement for the first and second clearance 101 and 102 to have small sizes, however, difficulty for installing the lens assembly 12 into the lens cylinder 11 is relatively increased and manufacturing yield is reduced.

FIG. 2 is an assembled cross section of a lens module 2 of Japanese Patent Application No. 3739295. The lens module 2 comprises a lens cylinder 21 and a lens assembly 22. The lens cylinder 21 has a light axis 200 and a cylindrical wall 211 enclosing the light axis 200. An accommodating space 212 is defined by an inner surface of the cylindrical wall 211 of the lens cylinder 21. The lens assembly 22 disposed in the accommodating space 212 comprises a single first lens 221 and two pieces of second lenses 222. The first lens 221 comprises an optical effective region 223a, a fixed region 224a encircling the optical effective region 223a, and an extending portion 225a extending from the circumference of the fixed region 224a in the direction of the light axis 200. Each of the second lenses 222 comprises an optical effective region 223b, a fixed region 224b encircling the optical effective region 223b, and an extending portion 225b extending from the circumference of the fixed region 224b in the direction of the light axis 200. Further, the extending portion 225a of the first lens 221 is provided with an outer circumferential surface 226a and an inner conical surface 227a, and the extending portion 225b of each of the second lenses 222 is provided with an outer circumferential surface 226b, an inner conical surface 227b and an outer conical surface 228.

A first clearance 201 is defined by the outer circumferential surface 226a of the first lens 221 and the inner wall surface of the cylindrical wall 211 of the lens cylinder 21, and a second clearance 202 is defined by the outer circumferential surface 226b of the second lenses 222 and the inner wall surface of the cylindrical wall 211 of the lens cylinder 21. The outer circumferential surface 226a of the first lens 221 is jacketed to the outer conical surface 228 of the extending portion 225b of the second lenses 222 and adjacent to the first lens 221, and the adjacent second lenses 222 are jacketed to each other at the inner conical surface 227b and the outer conical surface 228 therebetween. With respect to the structure of the lens module 2, only the first lens 221 and the inner wall surface of the cylindrical wall 211 of the lens cylinder 21 are utilized for tolerance fitting, i.e., only the first clearance 201 is needed to be controlled. Compared to the lens assembly 12 of the lens module 1 shown in FIG. 1, it is understood that the centers of the optical effective region 223a of the first lens 221 and the optical effective regions 223b of the second lenses 222 are easily kept at the light axis 200. However, the following inconveniences are encountered when manufacturing the lens module 2. The large-sized extending portions 225a/225b of the first/second lenses 221/222 are not suitable for application in mobile phones or thin and light cameras. Also, the costs of the raw material for manufacturing the extending portions 225a/225b of the first/second lenses 221/222 cannot be reduced.

BRIEF SUMMARY OF THE INVENTION

The objective of the invention is to provide a lens assembly with a fitting structure capable of increasing optical performance, facilitating assembly processes, and decreasing volume and cost.

A lens assembly with a fitting structure of the invention comprises a first lens and a second lens. The first lens comprises a first inner end surface, a first outer end surface opposite to the first inner end surface, and a plurality of slots. The first inner end surface comprises a first optical effective region centrally located at an optical axis and a first fixed region encircling the first optical effective region, and the plurality of slots are formed on the first fixed region of the first inner end surface in a circumferential direction and extended toward the first outer end surface. Each of the plurality of slots comprises an inner engaging side portion radially disposed next to the optical axis, an outer engaging side portion radially disposed to be distant from the optical axis, and a trough portion connected to the inner engaging side portion and the outer engaging side portion.

The second lens comprises a second inner end surface, a second outer end surface opposite to the second inner end surface, and a plurality of engaging blocks. The second inner end surface of the second lens and the first inner end surface of the first lens are facing oppositely to each other, the second inner end surface comprises a second optical effective region centrally located at the optical axis and a second fixed region encircling the second optical effective region, and the plurality of engaging blocks are formed on the second fixed region of the second inner end surface in the circumferential direction and extended toward the first inner end surface of the first lens. Each of the engaging blocks comprises an inner engaging protrusion disposed relative to the inner engaging side portion of the slot, an outer engaging protrusion disposed against the outer engaging side portion of the slot, and a crest portion disposed next to the first inner end surface of the first lens and connected to the inner engaging protrusion and the outer engaging protrusion. The engaging blocks of the second lens are respectively fitted into the slots of the first lens, and a slit is defined by the inner engaging side portion and the trough portion of the slot and the inner engaging protrusion and the crest portion of the engaging block.

The lens assembly with the fitting structure of the invention utilizes the engaging blocks fitted into the slots, thereby increasing optical performance, facilitating assembly processes, and decreasing volume and cost.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 3:
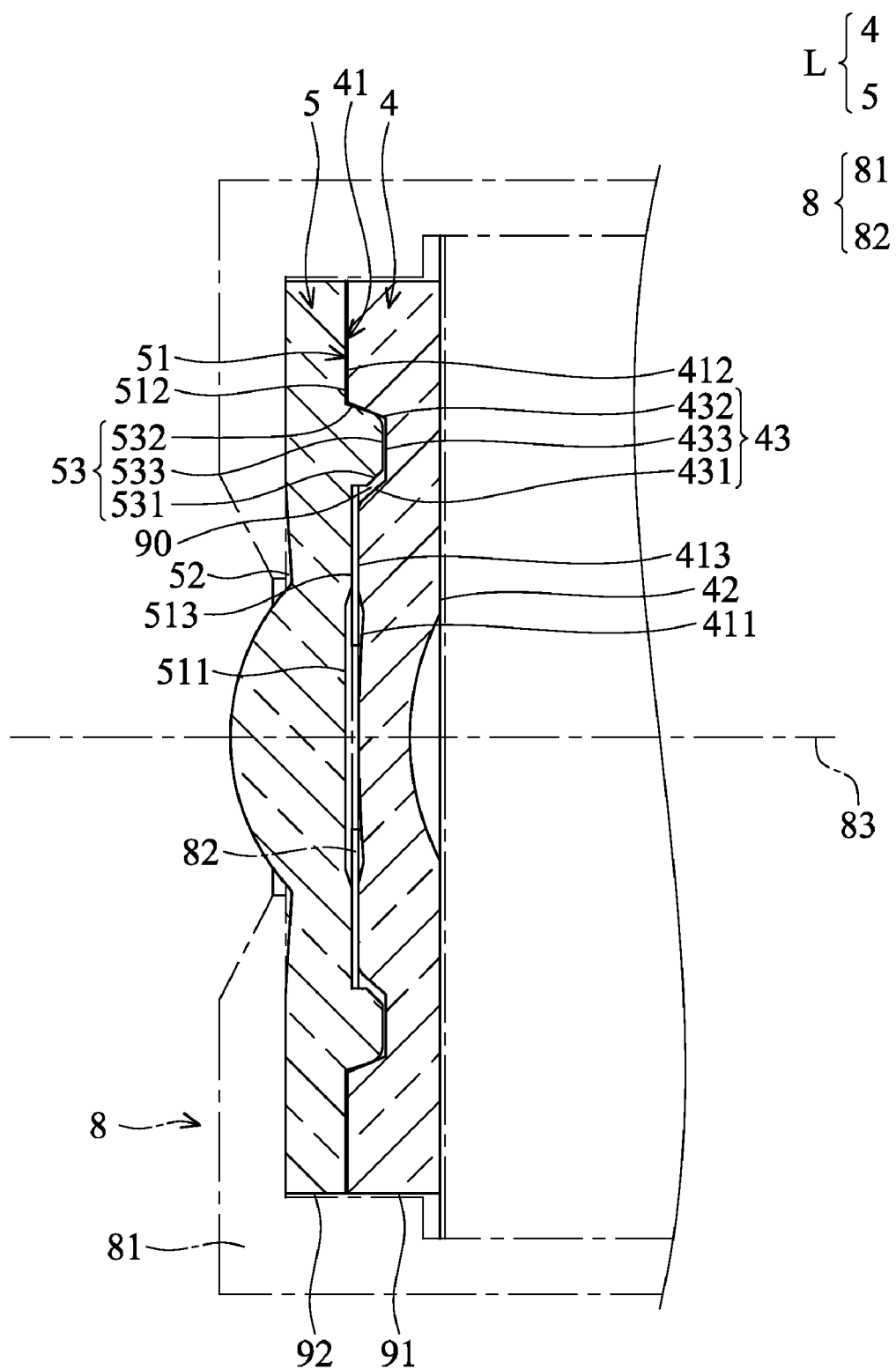
FIG. 3 is an assembled cross section of a lens assembly with a fitting structure of an embodiment of the invention.
Figure 4:
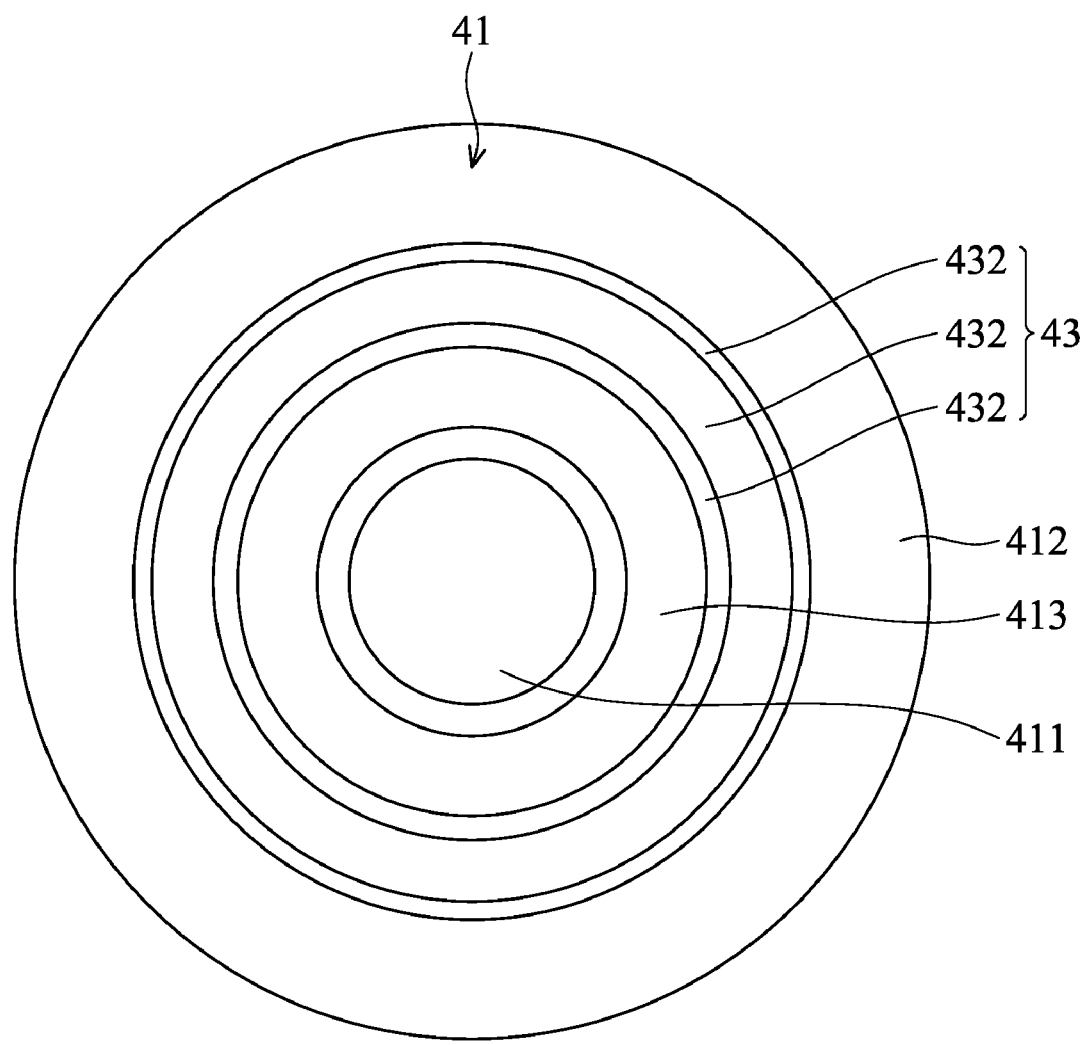
FIG. 4 is a rear view of the lens assembly with the fitting structure of the embodiment, utilized to describe a first lens thereof.
Figure 5:
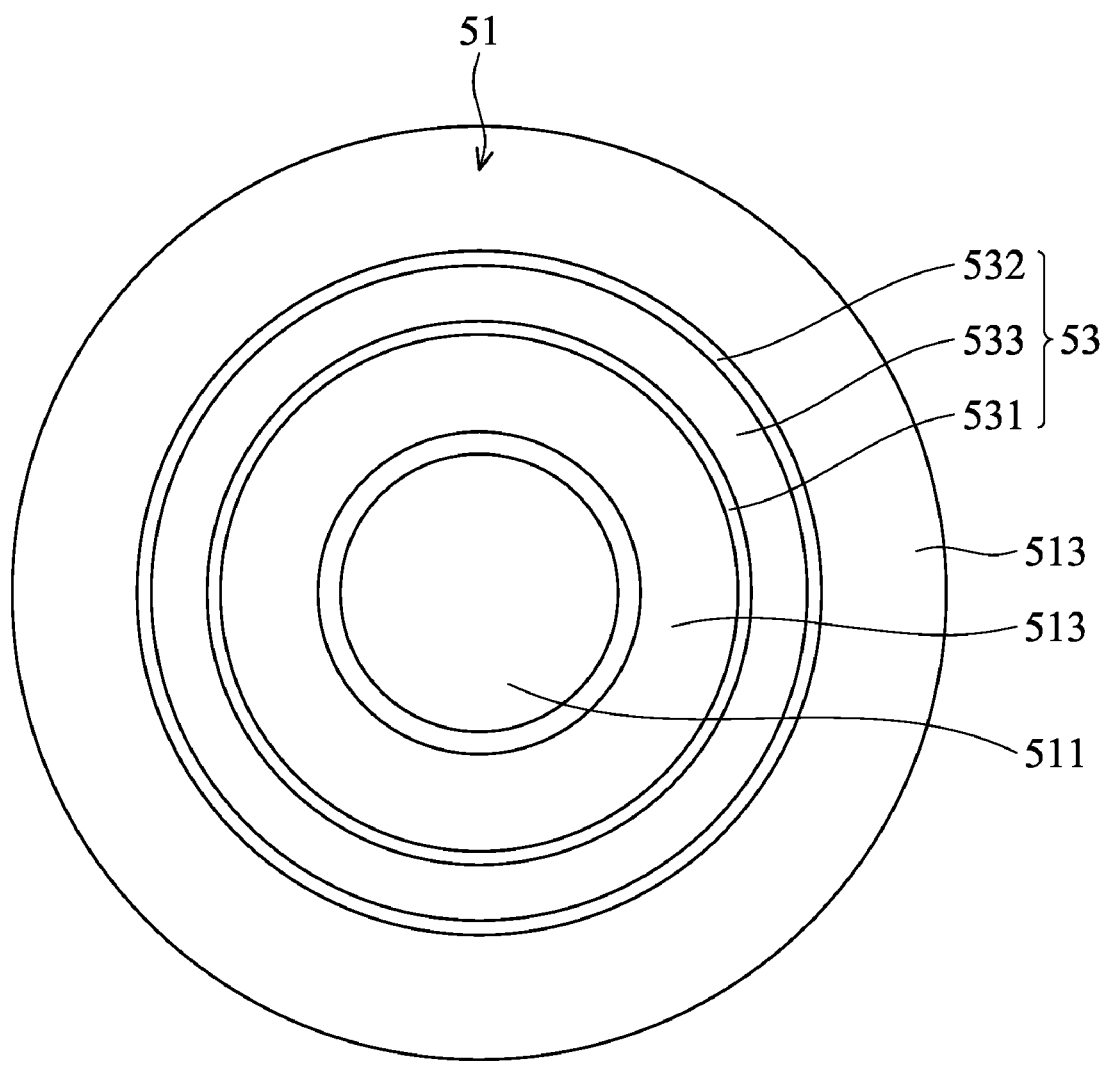
FIG. 5 is a front view of the lens assembly with the fitting structure of the embodiment, utilized to describe a second lens thereof.

FIG. 3 is an assembled cross section of a lens assembly L with a fitting structure of an embodiment, FIG. 4 is a rear view of the lens assembly L of the embodiment, and FIG. 5 is a front view of the lens assembly L of the embodiment. The lens assembly L with the fitting structure is suitable to be installed in a lens module 8. The lens module 8 comprises a lens cylinder 81 and a circular light slide 82. The lens assembly L comprises a first lens 4 and a second lens 5 which are installed in the lens cylinder 81 of the lens module 8.

The first lens 4 comprises a first inner end surface 41, a first outer end surface 42 opposite to the first inner end surface 41, and a plurality of slots 43. The first inner end surface 41 comprises a first optical effective region 411 centrally located at an optical axis 83 and a first fixed region 412 encircling the first optical effective region 411. The plurality of slots 43 are formed on the first fixed region 412 of the first inner end surface 41 in a circumferential direction and extended toward the first outer end surface 42. Each of the plurality of slots 43 comprises an inner engaging side portion 431 radially disposed next to the optical axis 83, an outer engaging side portion 432 radially disposed to be distant from the optical axis 83, and a trough portion 433 connected to the inner engaging side portion 431 and the outer engaging side portion 432. The plurality of slots 43 of the first lens 4 are circularly and continuously arranged, the trough portions 433 of the plurality of slots 43 of the first lens 4 are connected to present a toroidal surface perpendicular to the optical axis 83, the inner engaging side portions 431 of the plurality of slots 43 of the first lens 4 are connected and the outer engaging side portions 432 of the plurality of slots 43 of the first lens 4 are connected, and the connected inner engaging side portions 431 and the connected outer engaging side portions 432 are respectively and slantly extended from two ends of the trough portion 433 to form in a tapered shape. The first fixed region 412 of the first lens 4 is formed on a first abutted portion 413 located inside the slots 43. A first clearance 90 is defined by the engagement of the outer circumference of the first lens 4 and the inner circumference of the lens cylinder 81 of the lens module 8.

The second lens 5 comprises a second inner end surface 51, a second outer end surface 52 opposite to the second inner end surface 51, and a plurality of engaging blocks 53. The second inner end surface 51 of the second lens 5 and the first inner end surface 41 of the first lens 4 are facing oppositely to each other. The second inner end surface 51 comprises a second optical effective region 511 centrally located at the optical axis 83 and a second fixed region 512 encircling the second optical effective region 511. The plurality of engaging blocks 53 are formed on the second fixed region 512 of the second inner end surface 51 in the circumferential direction and extended toward the first inner end surface 41 of the first lens 4. Each of the engaging blocks 53 comprises an inner engaging protrusion 531 disposed relative to the inner engaging side portion 431 of the slot 43, an outer engaging protrusion 532 disposed against the outer engaging side portion 432 of the slot 43, and a crest portion 533 disposed next to the first inner end surface 41 of the first lens 4 and connected to the inner engaging protrusion 531 and the outer engaging protrusion 532. The engaging blocks 53 of the second lens 5 are respectively fitted into the slots 43 of the first lens 4, and a slit 90 is defined by the inner engaging side portion 431 and the trough portion 433 of the slot 43 and the inner engaging protrusion 531 and the crest portion 533 of the engaging block 53, thereby assuring the outer engaging protrusions 532 of the engaging blocks 53 to abut against the outer engaging side portions 432 of the slots 43. The engaging blocks 53 are circularly and continuously arranged to form a protruded toroid. The second fixed region 512 of the second lens 5 is formed on a second abutted portion located inside the engaging blocks 53, and the first and second abutted portions are mutually engaged to secure the circular light slide 82. A second clearance 92 is defined by the engagement of the outer circumference of the second lens 5 and the inner circumference of the lens cylinder 81 of the lens module 8.

The functions of the lens assembly L with the fitting structure of the embodiment are described as follow.

First, due to the engaging blocks 53 respectively fitted into the slots 43 to cause the first and second lenses 4 and 5 to be concentrically arranged, it is unnecessary to simultaneously control the accuracies of the first and second clearance 91 and 92 during the manufacturing process, and the center of the second optical effective region 511 of the second inner end surface 51 is located at the optical axis 83, thereby increasing resolution and optical performance. Because the first clearance 91 can be greater than the second clearance 92, the assembly of the first lens 4 into the lens cylinder 81 of the lens module 8 is facilitated.

Figure 1:
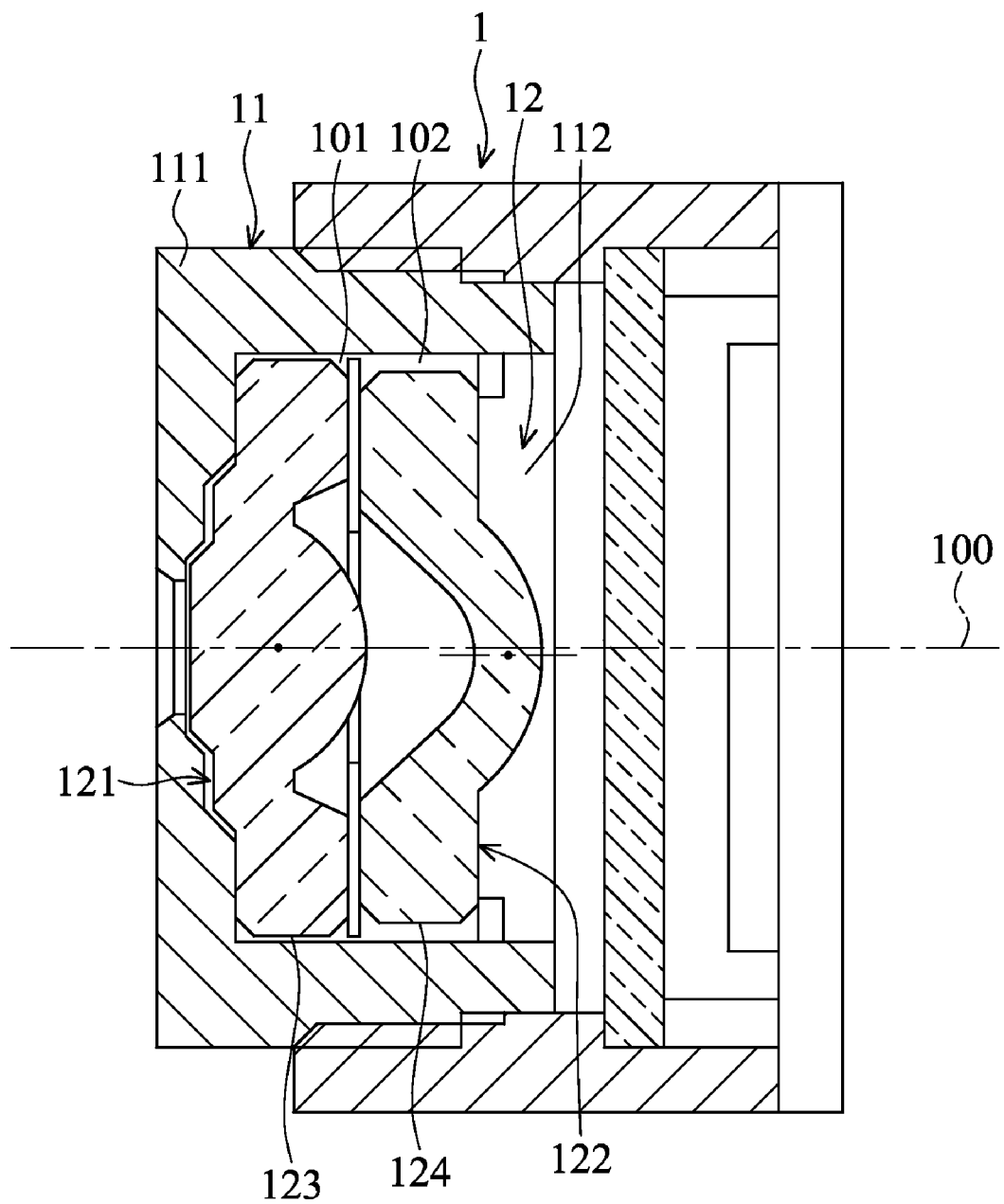
FIG. 1 is an assembled cross section of a conventional lens module.
Figure 2:
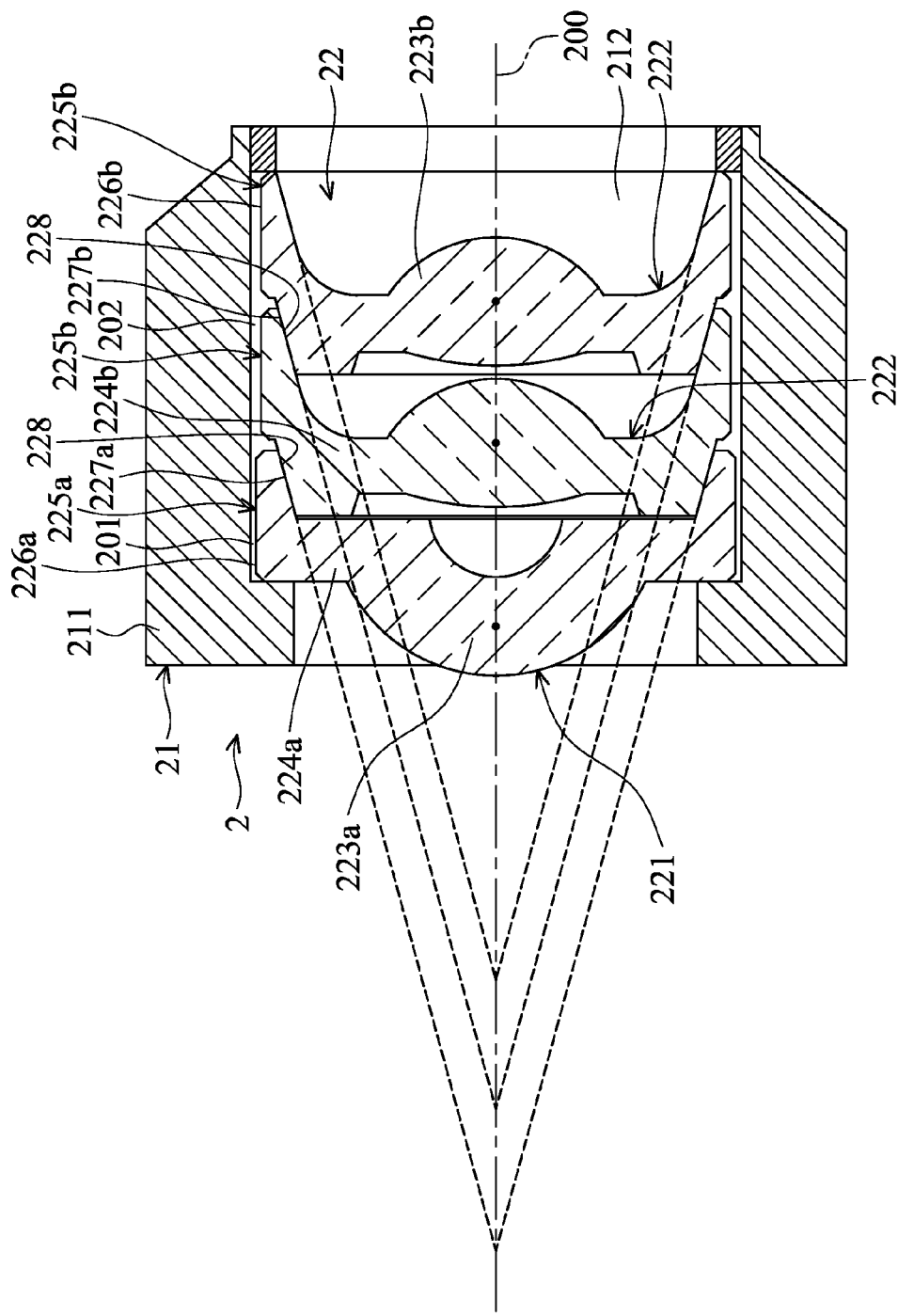
FIG. 2 is an assembled cross section of another conventional lens module.

Further, without the conventional large-sized extending portions 225a/225b (as shown in FIG. 2) being formed on the first and second lenses 4 and 5, the total volume and the raw material costs of the lens assembly L with the fitting structure can be decreased.

Further, with the existence of the slit 90, the connection of the first and second lenses 4 and 5 can be mainly completed by abutting the outer engaging protrusion 532 of the engaging block 53 to the outer engaging side portion 432 of the slot 43. Due to small contact area and adequate acting force for fitting, the second optical effective region 511 of the second inner end surface 51 is not stressed or deformed, thereby increasing resolution.

Further, due to the slot 43 and the engaging block 53 being adequately fitted therebetween, it is unnecessary to additionally enlarge the clearance of the fitted regions of the slot 43 and the engaging block 53 for eliminating abnormal stress and deformation. Thus, the structural relationship of the first and second lenses 4 and 5, i.e., front and rear, and the centers of the first optical effective region 411 of the first inner end surface 41 and the second optical effective region 511 of the second inner end surface 51 can be accurately remained, thereby increasing optical performance.

Note that the same described functions can be achieved by a lens assembly provided with more than two lenses, wherein the lenses are connected by the fitting structure formed by the engaging blocks 53 and the slots 43.

Additionally, in the embodiments above, the slots 43 are circularly and continuously arranged, and the engaging blocks 53 are also circularly and continuously arranged. In other varied embodiments, the engaging blocks 53 and the slots 43 can be configured by permutation and/or in combination. For example, one engaging block 53 can be arranged between any two of the slots 43 which are circularly and continuously arranged, or the slots 43 and the engaging blocks 53 can be alternatively arranged, instead of circularly and continuously arranged.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens assembly with a fitting structure, comprising:
a first lens comprising a first inner end surface, a first outer end surface opposite to the first inner end surface, and a plurality of slots, wherein the first inner end surface comprises a first optical effective region centrally located at an optical axis and a first fixed region encircling the first optical effective region, and the plurality of slots are formed on the first fixed region of the first inner end surface in a circumferential direction and extended toward the first outer end surface, wherein each of the plurality of slots comprises an inner engaging side portion radially disposed next to the optical axis, an outer engaging side portion radially disposed to be distant from the optical axis, and a trough portion connected to the inner engaging side portion and the outer engaging side portion; and a second lens comprising a second inner end surface, a second outer end surface opposite to the second inner end surface, and a plurality of engaging blocks, wherein the second inner end surface of the second lens and the first inner end surface of the first lens are facing oppositely to each other, the second inner end surface comprises a second optical effective region centrally located at the optical axis and a second fixed region encircling the second optical effective region, and the plurality of engaging blocks are formed on the second fixed region of the second inner end surface in the circumferential direction and extended toward the first inner end surface of the first lens, wherein each of the engaging blocks comprises an inner engaging protrusion disposed relative to the inner engaging side portion of the slot, an outer engaging protrusion disposed against the outer engaging side portion of the slot, and a crest portion disposed next to the first inner end surface of the first lens and connected to the inner engaging protrusion and the outer engaging protrusion, and the engaging blocks of the second lens are respectively fitted into the slots of the first lens where a contact area is formed between the outer engaging protrusion of the block and the outer engaging side portion of the slot, and the second lens is connected to the first lens by the contact area, and a gap is defined for the block when the block is fitted into the slot by the inner engaging side portion and the trough portion of the slot and the inner engaging protrusion of the engaging block thereby assuring that the outer engaging protrusion of the block abuts against the outer engaging side portion of the slot at the contact areas.

2. The lens assembly with the fitting structure as claimed in claim 1, wherein the plurality of slots of the first lens are circularly and continuously arranged, the trough portion of the plurality of slots of the first lens are connected to present a toroidal surface perpendicular to the optical axis, the inner engaging side portions of the plurality of slots of the first lens are connected and the outer engaging side portions of the plurality of slots of the first lens are connected, the connected inner engaging side portions and the connected outer engaging side portions are respectively and slantly extended from two ends of the trough portion to form in a tapered shape, and the plurality of engaging blocks of the second lens are circularly and continuously arranged to form a protruded toroid.

3. The lens assembly with the fitting structure as claimed in claim 2, wherein the lens assembly with the fitting structure is secured by a circular light slide, the first fixed region of the first lens is formed on a first abutted portion located inside the slots, the second fixed region of the second lens is formed on a second abutted portion located inside the engaging blocks, and the first and second abutted portions are mutually engaged to secure the circular light slide.

* * * * *